United States Patent [19]

Bory

[11] Patent Number: 4,751,916
[45] Date of Patent: Jun. 21, 1988

[54] ULTRASONIC TOOL

[75] Inventor: Michael Bory, Wattwil, Switzerland

[73] Assignee: Dieter Hansen AG, Wattwil, Switzerland

[21] Appl. No.: 840,622

[22] Filed: Mar. 17, 1986

[30] Foreign Application Priority Data

Mar. 21, 1985 [CH] Switzerland ............ 1263/85

[51] Int. Cl.[4] ................................. A61H 23/00
[52] U.S. Cl. ................................. 128/24 A; 51/59 SS; 173/171
[58] Field of Search .............. 128/24 A, 305; 411/388, 411/389, 403, 413; 604/22; 433/86, 119; 310/316–317; 228/110; 82/DIG. 9

[56] References Cited

U.S. PATENT DOCUMENTS

| | | | |
|---|---|---|---|
| 389,028 | 9/1888 | Wallace | 411/413 |
| 4,315,676 | 3/1985 | Nash et al. | 433/86 X |
| 4,505,676 | 3/1985 | Gonser | 433/86 X |
| 4,535,759 | 8/1985 | Polk et al. | 128/24 A |

OTHER PUBLICATIONS

Neppiras, E. A., "Macrosonics in Industry Part I", *Ultrasonics*, London #10 (Jan. 1972), pp. 9–13.

Hulst, A. P., "Macrosonics in Industry Part II", *Ultrasonics*, London #10 (Nov. 1972), pp. 252–261.

*Primary Examiner*—Francis J. Jaworski
*Attorney, Agent, or Firm*—Sughrue, Mion, Zinn, Macpeak & Seas

[57] ABSTRACT

An ultrasonic tool instrument includes an axial assembly of a piezoelectrically driven transducer 1, a mechanical amplifier or booster 2, and an elongate concentrator or sonotrode 3. The abutting end surfaces 26, 33 and centering shoulders 25, 34 of the amplifier and sonotrode are tightly clamped together by a differentially threaded screw sleeve 4 accessed by a rotatable key rod 5 extending through central bores 18, 28 in the transducer and amplifier to ensure the precise axial alignment and centering of the sonotrode.

5 Claims, 1 Drawing Sheet

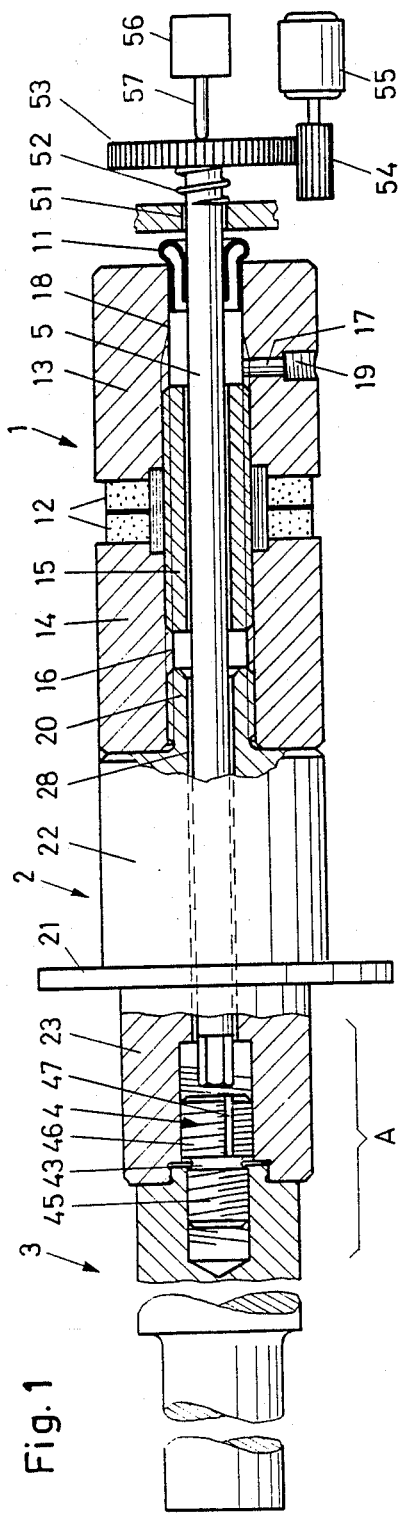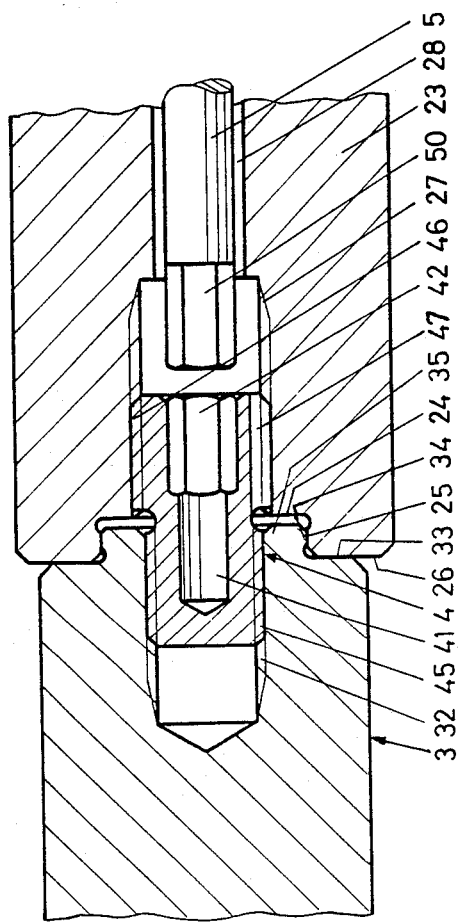

ULTRASONIC TOOL

BACKGROUND OF THE INVENTION

This invention relates to an ultrasonic tool, including an apparatus coupling one end of an elongate sonotrode to the mechanical amplifier portion of an ultrasonic tool or instrument.

In ultrasonic tools and processing instruments of the type including a vibrational transducer, a mechanical amplifier or booster element coupled to the transducer for enhancing the amplitude of its vibrational oscillations, and an elongate sonotrode or "mason's horn" coupled to an output end of the amplifier element, one prior art arrangement for effecting the latter coupling simply amounts to threading one end of the sonotrode and screwing it into a similarly threaded bore in the end of the amplifier element. An extremely precise axial alignment of the coupled components is essential in devices of this type, however, and such alignment is thwarted in the construction just described since the angular orientation of the screwed in sonotrode relative to the end of the amplifier element is a function of thread wear, the amount of abrasive material introduced between the abutting surfaces of the two components, etc. Precise axial alignment is thus difficult to achieve in an assembly arrangement of this type, which entails a tedious adjustment process following the installation of each new sonotrode.

In another prior art design a flanged end of the sonotrode is attached to the externally threaded output end of the amplifier using a centrally apertured screw cap through which the sonotrode body extends. This allows the same relative angular orientation between the two components to be maintained as the sonotrode itself is not rotated, but axial offsets are still a problem and the relatively large mass of the screw cap absorbs vibratory energy and thus reduces the useful output amplitude of the device.

In ultrasonic instruments of this type the sonotrodes are subject to heavy wear and deterioration, and must be frequently replaced. The known mounting arrangements for such sonotrodes do not enable their rapid exchange with precise axial alignment and an effective energy propagation.

SUMMARY OF THE INVENTION

To overcome these drawbacks of the prior art in an ultrasonic tool instrument including an axial assembly of a piezoelectrically driven transducer, a mechanical amplifier or booster, and an elongate concentrator or sonotrode, in accordance with the invention the abutting end surfaces and centering shoulders of the amplifier and sonotrode are tightly clamped together by a differentially threaded screw sleeve accessed by a rotatable key rod extending through central bores in the transducer and amplifier. Such an arrangement ensures the precise axial alignment and centering of the sonotrode upon installation, while maintaining a desired angular orientation between the sonotrode and the amplifier.

BRIEF DESCRIPTION OF THE DRAWINGS

FIG. 1 is an axial view, partly in section, of an ultrasonic instrument constructed in accordance with the present invention, and FIG. 2 is an enlarged axial section of the portion of the instrument bracketed at A in FIG. 1, illustrating the coupling arrangement between the amplifier and sonotrode.

DETAILED DESCRIPTION OF THE PREFERRED EMBODIMENT

Referring to FIG. 1, the illustrated ultrasonic instrument includes a transducer 1, a mechanical amplifier 2 and a sonotrode 3. The transducer is symmetrically constructed and is driven by piezoelectric elements 12 which oscillate at a frequency of about 20 KHz when excited by an electrical source, not shown. The ring like piezoelectric elements are flanked by centrally bored oscillatory cylinders 13, 14 which are threaded onto a female sleeve 15 to compressively engage the elements. The length of each cylinder is one-fourth of the operational wavelength. A central bore 18 extending axially through the transducer is accessed by a radial passage 17 in the cylinder 13 having a scavenging air connection 19.

The mechanical amplifier 2 is screwed into the transducer cylinder 14 by a threaded nipple or extension 20 which engages similar threads 16 in the bore 18. The amplifier comprises a first cylindrical portion 22 of equal diameter to the transducer cylinders 13, 14, and a second, smaller diameter cylindrical portion 23. A flange 21 extends outwardly from the nodal circle of the amplifier for attachment to a processing machine housing, not shown. The reduction in diameter between the first and second cylindrical portions implements the desired amplification of the oscillatory vibrations. An axial bore 28 extends through the amplifier, and carries threads 27 on an enlarged diameter recess in the end of the second cylindrical portion 23. The output end of the amplifier, as best shown in FIG. 2, has a flat ring-like frontal surface 26 and a coaxial countersink 24 with a conical centering or axial alignment shoulder 25.

The sonotrode 3 is a solid, elongate cylindrical metal bar or rod which would normally taper towards its outer end and have a tool crown attached thereto in the usual manner, although this is not shown in the drawings in the interest of simplicity. Its proximal side facing the amplifier 2 defines a flat ring-like surface 33 which mates with the amplifier surface 26, and a coaxial mounting and centering post 35 extends outwardly from the surface 33 and defines a conical shoulder 34 for precise engagement with the amplifier shoulder 25. A blind axial bore 32 extends into the end of the sonotrode; its maximum diameter between the bases of its threads is no greater than the crown diameter of the threads 27 in the amplifier, and its own threads have a greater pitch than that of the threads 27.

The attachment of the sonotrode to the amplifier is implemented by a differential screw sleeve 4 having separate threads 45, 46 which respectively engage the threads in the sonotrode bore 32 and the threads 27 in the amplifier. The threads 45, 46 are separated from one another by a circular channel 43. The end of the screw sleeve 4 facing the amplifier has a blind bore 41 defining a hexagonal recess 42 at its outer end.

To tighten and release the screw sleeve 4, a key rod 5 having a hexagonal tip 50 in the manner of an Allen wrench is permanently disposed in the aligned axial bores 18, 28 extending through the transducer and amplifier. The key rod is biased out of engagement with the screw sleeve by a spring 52 bearing against a fixed portion of the machine frame 51 at one end and against a gear 53 mounted to the end of the rod 5 at the other end. The spring force is overcome to engage the key rod with the screw sleeve by energizing a solenoid 56 whose core extension 57 acts against the gear 53. A pinion 54 engages the gear 53 and is driven by a reversible motor 55 to effect the tightening or release of the sonotrode by appropriately rotating the screw sleeve 4. When the sleeve is rotated in one direction it screws deeper into the amplifier and simultaneously screws itself out of the sonotrode bore 32 at an even faster rate due to the differential thread pitches, to thereby release the sonotrode and push it away from the amplifier. The rotation of the screw sleeve in the opposite direction accomplishes just the reverse, i.e. the positive tightening or clamping of the axially aligned sonotrode against the amplifier. The flange 21 and motor 55 are both rigidly mounted to the machine frame 51 to transmit the tightening and releasing torque and prevent any rotation of the transducer and amplifier assembly.

An elastic seal 11 is disposed around the key rod 5 at its exit from the transducer cylinder 13. When tightening or releasing the screw sleeve 4, scavenging air can be blown into the connection 19 and radial bore 17, down the longitudinal bores 18, 28 and through one or more longitudinal grooves 47 in the screw sleeve to purge the gap between the surfaces 26, 23 of any drilling residue emulsion and thereby ensure an accurate fit.

What is claimed is:

1. An ultrasonic tool, comprising:
   (a) a vibratory transducer (1),
   (b) an elongate mechanical amplifier (2) coupled to and driven by the transducer, an output end of said amplifier having a first centering shoulder (25) disposed therein which is axially oriented with respect to the elongate dimension of said mechanical amplifier,
   (c) an elongate sonotrode (3) having an input end having a second centering shoulder (34) disposed therein which is axially oriented with respect to the elongate dimension of said sonotrode and is disposed in mating engagement with the first shoulder, the output end of the amplifier and the input end of the sonotrode abutting each other,
   (d) central, axially aligned, differentially threaded bores (28, 32) defined in respective abutting output and input ends of the amplifier and sonotrode, and
   (e) a differentially threaded screw member (4) having opposite ends engaged in the respective threaded bores for tightly coupling the sonotrode to the amplifier in precise axial alignment upon rotation of said screw member in one direction and for releasing the sonotrode from the amplifier upon rotation of said screw member in another, opposite direction, wherein the sonotrode bore is of smaller diameter than the amplifier bore, the sonotrode bore threads have a higher pitch than the amplifier bore threads, and the amplifier bore extends completely therethrough, said machine tool further comprising an axial bore (18) extending through the transducer and aligned with the amplifier bore, and a key rod rotatably disposed in the transducer and amplifier bores for engagement with the screw member, wherein the key rod is axially displaceable from a first position inside said transducer and amplifier bores in which the key rod is disengaged from the screw member into a second position in which the key rod is engaged with the screw member, and a clearance is defined between the key rod and said bores.

2. A tool according to claim 1, further comprising a reversible motor (55) commonly mounted with the amplifier and coupled to the key rod to effect rotation of the key rod.

3. A tool according to claim 1, further comprising an air seal (11) disposed between the key rod and one end of the transducer, and passage means (19, 17, 18, 28) for supplying scavenging air to the abutting ends of the amplifier and sonotrode.

4. A tool according to claim 3, wherein the passage means includes an outer axial groove extending through a portion of the screw member engaged in the amplifier bore.

5. A tool according to claim 1, wherein the first and second centering shoulders are conical, and the abutting ends of the amplifier and sonotrode comprise flat circular surfaces (26, 33) surrounding the shoulders.

* * * * *